United States Patent Office 3,632,720
Patented Jan. 4, 1972

3,632,720
METHOD OF FABRICATING CABLES
Raymond C. Mildner, Midland, Mich., assignor to The Dow Chemical Company, Midland, Mich.
Filed Mar. 3, 1969, Ser. No. 803,857
Int. Cl. B29c 25/00; B29f 3/10; C08f 45/08
U.S. Cl. 264—174                                    2 Claims

ABSTRACT OF THE DISCLOSURE

A cable having an improved core screen of conductive polymer material on the core of the cable is produced by passing a cable having a layer of insulation as the core through a bath containing a latex of conductive polymer material such as a blend of a copolymer of ethylene and acrylic acid and carbon black to deposit the blend on the cable core. A strip of metal is then wrapped or otherwise formed around the core screen to provide a protective metal shield. An outer jacket of plastic can then be extruded over the protective metal shield.

---

Figure 2:
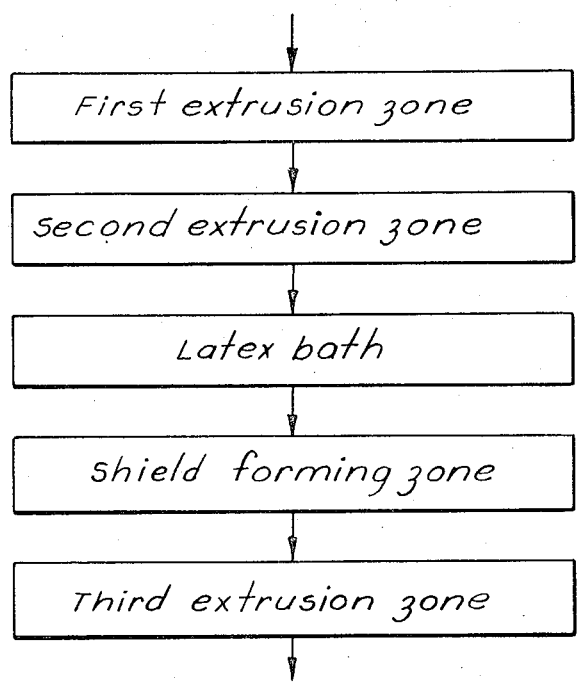

This invention relates to the art of cables. In one aspect, this invention relates to methods of fabricating cables. In another aspect, this invention relates to methods of providing a flexible conductive screen at the insulation boundaries of a high voltage electric cable.

The term "screen," as used herein in connection with cables, means a layer of conductive material at the boundary between a conductor and an insulating layer and at the boundary between the insulating layer and a protective metal shield. In general, an electric cable for transmitting high voltages has a first screen surrounding the main conductor and a second screen located between the insulating layer and the protective metal shield.

Insofar as the properties of a cable are concerned, from an electrical standpoint, it is desirable to have the screens of conductive material in intimate and direct contact with the layer of insulation and with the conductor and the protective metal shield over their entire areas of contact. Since cables are subjected to repeated flexing, to dramatic changes in weather, and to rather rough treatment during installation and during use, it is desirable to fabricate the conductive screens of a material and by a technique which will insure that the screens remain in contact with their respective adjacent elements throughout the life of the cable.

The prior art cable constructions employ screens in the form of resistive tapes or laminates comprising very thin metal foils bonded to paper or some other suitable substrate. The laminates are wound or otherwise wrapped around a conductor before a layer of insulation is applied and again after the insulation is applied and before a protective metal shield is wrapped around the insulation. Other cable designs employ screens formed by extruding a plastic having a high loading of conductive carbon black. Neither of these constructions are completely satisfactory because bending the cable subjects the screens to a great deal of strain thus causing them to lose contact with the insulation and with the main conductor and the protective metal shield. The different coefficients of thermal expansion of the conductive plastic and of the metal in the conductor and in the protective metal shield also subjects the screens to a great deal of strain because these elements expand and contract at different rates when the temperature of the cable changes. This phenomenon also causes the screens to lose contact with their respective metal components thus causing cavities to form. The loss of contact between the resistive screens and the metal components created either by bending the cable or by changes in temperature of the cable results in electrical losses thus decreasing the over-all effectiveness of the cable.

Another shortcoming of the extruded core screens of the prior art is the high electrical resistance, often referred to in the art as boundary resistance, at the interface or boundary between the protective metal shield and the resistive screen. The electrical conductivity between the resistive screen and the metal shield results from the carbon black particles which are in contact with the metal shield or which lie within about 20 angstroms of the surface of the metal shield. It is thus evident that the higher the concentration of carbon black particles in contact with the metal shield or within 20 angstroms of the metal shield, the better the conductivity between the screen and the shield and hence the lower the boundary resistance between them. Since the addition of carbon black to a polymer material affects the processability of the polymer, it is often difficult to achieve the desired concentrations of carbon black in a core screen produced by extrusion and it is particularly difficult to achieve a high concentration of carbon black in the outer periphery of the core screen because polymers having high loadings of carbon black cannot be satisfactorily extruded.

According to this invention, these and other disadvantages of the prior art cables and particularly the screens employed therein are overcome by means of a screen comprising an electrically conductive blend of an adhesive polymer material and carbon black deposited on the core of the cable from a latex bath containing the blend of polymer and carbon black. By depositing the screens from a latex in accordance with this invention, it has been discovered that the resulting cable is much better in terms of maintaining a continuous bond with the protective metal shield and with the insulation thus preventing the formation of cavities in the vicinity of the screens. The latex-deposited screens of this invention have a lower boundary resistance with the protective metal shield because the adhesive polymer material deposited from a latex can accommodate large quantities of carbon black thus providing a high concentration of carbon black in the screen.

Accordingly, it is an object of this invention to provide a method of producing a cable having improved electrical properties.

Another object of this invention is to provide a cable having an improved screen.

A further object of this invention is to provide a cable which allows the outer jacket and the protective metal shield to be readily stripped from the cable core.

Still another object of this invention is to provide a cable having a low boundary resistance between the core screen and the protective metal shield.

Figure 1:
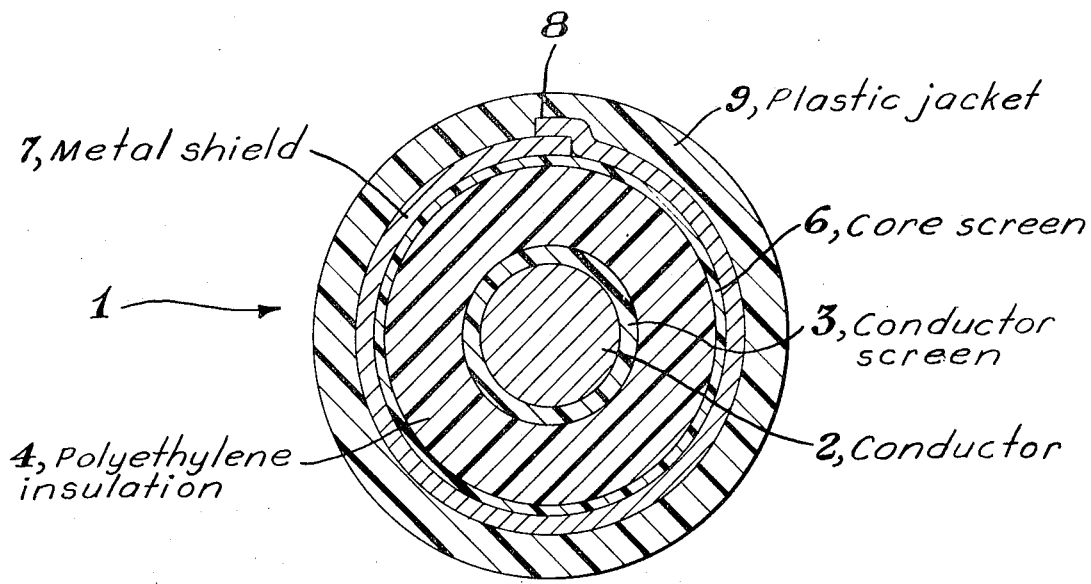

These and other objects of the invention will become apparent to one skilled in the art after studying the following detailed description, the appended claims, and the accompanying drawing wherein:

FIG. 1 is a cross section of a cable fabricated in accordance with the invention; and FIG. 2 is a schematic diagram indicating the several steps employed in fabricating a cable according to the invention.

Referring now to the drawing, the invention will be illustrated by describing a method of fabricating a cable according to one embodiment of the invention.

A cable shown generally by reference numeral 1 in FIG. 1 comprises an electric conductor 2 which can be in the form of a plurality of copper or aluminum wires twisted together or in the form of a single wire, a conductor screen 3 of a conductive polymer material surrounding the conductor 2, and a layer of insulation 4 of polyethylene or the like surrounding the conductor screen 3. A core screen 6 of a conductive polymer deposited from a latex according to the invention surrounds the insulation 4. A metal shield 7 of copper or aluminum is longitudinally folded around the core screen 6 such that the edges thereof are overlapped to provide a seam 8 longitudinal of the cable. A strip of metal in the form of a tape or one or more wires can be helically wrapped around the core 6 in lieu of the longitudinally folded metal shield 7 if desired. An outer jacket 9 of polyethylene or the like surrounds the metal shield 7. The outer jacket 9 is optional and the cable can be used without it if desired.

In practicing the method of this invention, which is depicted schematically by FIG. 2 of the drawing, a conductor is passed through an extrusion zone to produce a first screen of a conductive polymer coating in the form of a layer surrounding the conductor. The conductor having the first screen is then passed through an extrusion zone to produce a layer of an insulating polymer material around the first screen. The conductor having the layer of insulating polymer material is then passed through a bath containing a latex of a conductive polymer material to provide a second screen of the conductive polymer material in the latex bath in the form of a layer surrounding the layer of the insulating polymer material. The resulting product is then passed to a wrapping zone wherein a metal shield is wrapped around the conductor having the second screen as its outermost surface by longitudinally folding or helically winding a strip of the metal around the conductor. An outer jacket of plastic material is then extruded over the metal shield if desired. The outer jacket is optional since the cable can be used with the metal shield as the outermost element.

The conductor screen 3 can be extruded over the conductor 2 by passing the conductor through a suitable crosshead die extruder which functions to deposit the conductive layer of polymer material. Any suitable low modulus polymer containing, for example, between about 25 and about 40 weight percent carbon black can be used. Exemplary polymers include chlorinated polyethylene, polyvinyl chloride, and copolymers of ethylene or propylene with other polymerizable monomers such as isobutyl acrylate, ethyl acrylate, vinyl acetate, and the like. The conductor screen 3 of conductive polymer material can be of any suitable thickness and will depend upon the particular type of cable being constructed, the size of the cable, the voltage which the cable will carry, and the like. In general, the layer of conductive polymer material which serves as a conductor screen is preferably between about 10 and about 40 mils thick.

The layer of insulation 4 surrounding the conductor screen 3 is extruded over the screen by passing it through a suitable cross-head die extruder. The insulation 4 can be of any suitable polymer material such as, for example, polyethylene, polypropylene, chlorinated polyethylene, butyl rubber or the like. The polymer of the insulation can contain cross-linking agents so that it can be subsequently cross-linked by heat treatment or irradiation. The thickness of the insulation 4 will depend largely upon the load which the cable is designed to carry. In general, the insulating layer is at least about 100 mils thick with no practical upper limit except as that dictated by economics.

The latex-deposited core screen 6 is deposited on the outer surface of the insulation 4 by passing the conductor having the insulation 4 as the exterior surface through a bath containing a latex of a conductive polymer material to provide a core screen of the desired thickness. It is generally preferred to pass the cable through the latex bath as soon as the insulation 4 is extruded over the core screen to take advantage of the latent heat in the layer of insulation. The screen deposited on the insulation by the latex bath is of any convenient thickness and is generally between about 0.5 and about 5 mils. In some cases it may be necessary to pass the cable through several baths or through the same bath several times to achieve a core screen of the desired thickness.

The conductive polymer material which is deposited from the latex bath to produce the core screen on the layer of insulation comprises a blend of carbon black and an adhesive polymer material selected from the group consisting of copolymers of an $\alpha$-olefin having up to and including 6 carbon atoms per molecule and an ethylenically unsaturated carboxylic acid having between 3 and 8 carbon atoms per molecule and terpolymers of an $\alpha$-olefin having up to and including 6 carbon atoms per molecule, an ethylenically unsaturated carboxylic acid having between 3 and 8 carbon atoms per molecule, and a third monomer selected from the group consisting of alkyl esters of an ethylenically unsaturated carboxylic acid having between 3 and 8 carbon atoms per molecule wherein the alkyl moiety of the ester contains up to and including 8 carbon atoms and vinyl esters of a saturated carboxylic acid having up to 8 carbon atoms per molecule.

Exemplary olefins which can be polymerized with an ethylenically unsaturated carboxylic acid to produce the copolymer or terpolymer include ethylene, propylene, 1-butene, 1-pentene, methylpropene, 4-methyl-1-pentene, and the like. The polymer can be of the random variety obtained by copolymerizing the olefin and the ethylenically unsaturated carboxylic acid or it can be of the graft variety obtained by grafting the ethylenically unsaturated carboxylic acid onto a suitable polyolefin.

Exemplary ethylenically unsaturated carboxylic acids which can be copolymerized with the olefin or grafted onto the polyolefin to produce the copolymer or terpolymer include acrylic acid, methacrylic acid, ethacrylic acid, crotonic acid, isocrotonic acid, tiglic acid, angelic acid, senecioic acid, itaconic acid, hexenoic acid, teracrylic acid and the like.

Exemplary alkyl esters of ethylenically unsaturated carboxylic acids which can be polymerized with the olefin and the ethylenically unsaturated carboxylic acid to produce the terpolymer useful in preparing the conductive polymer employed in the practice of the invention include methyl methacrylate, ethyl methacrylate, methyl ethacrylate, isobutyl acrylate, methyl angelate, ethyl senecioate and the like. Exemplary vinyl esters of saturated carboxylic acids which can be copolymerized with the olefin and the ethylenically unsaturated carboxylic acid to produce a terpolymer useful in practicing the invention include vinyl acetate, vinyl propionate, vinyl butyrate, vinyl caprylate, and the like.

The polymer materials which are rendered conductive by blending with carbon black and which are formed into a latex for deposition according to the teachings of this invention can have any suitable amount of combined acid such as, for example, between about 0.5 and about 25 weight percent ethylenically unsaturated carboxylic acid, up to about 39.5 weight percent combined ester of an acid of the type described, and between about 60 and about 99.5 percent by weight combined olefin. Thus, the polymer material can be, for example, a copolymer containing 99.5 weight percent olefin and 0.5 weight percent acid; a copolymer containing 75 weight percent olefin and 25 weight percent acid; a terpolymer containing 60 weight percent olefin, 39.5 weight percent ester of an acid, and 0.5 weight percent acid; a terpolymer containing 60 weight percent olefin, 15 weight percent ester of an acid, and 25 weight percent acid; a terpolymer containing 80 weight percent olefin, 12 weight percent ester of an acid, and 8 weight percent acid; and the like.

The copolymers and terpolymers employed in the practice of this invention can be obtained commercially or they can be prepared by processes well known in the art. Although the invention is not to be limited or bound by any particular technique for preparing the polymer, the graft copolymer variety which is suitable for use in the practice of the invention can be prepared by the methods outlined in U.S. Pats. 3,177,269 and 3,270,090, the disclosures of which are specifically incorporated herein by reference. A suitable technique for preparing the terpolymer which can be used in the practice of the invention is outlined in U.S. Pat. 3,249,570, the disclosure of which is likewise specifically incorporated herein by reference.

The adhesive polymer material which is deposited on the insulating layer of the cable from the latex is rendered conductive by blending electrically conductive carbon black into the polymer latex. The electrically conductive carbon black particles are preferably of an elongated structure as opposed to a spherical structure. The elongated structure tends to promote the formation of continuous conducting paths through the adhesive polymer composition. The carbon black is blended with the polymer material in an amount sufficient to provide between about 25 and about 60 weight percent carbon black in the blend, based upon the total weight of the blend. This can be accomplished by adding the carbon black particles to the polymer latex under conditions of high mechanical shear to insure uniform distribution of the carbon black particles throughout the polymer in the latex.

The latex of conductive polymer material through which the conductor having the insulating layer is passed to provide the conductive screen can be prepared by any suitable technique. One exemplary technique which can be employed for preparing the latex is described in U.S. Pat. 3,389,109, the disclosure of which is specifically incorporated herein by reference. In general, the latex of the conductive polymer can be prepared by dissolving the polymer in a water-miscible organic solvent. The solvent containing the polymer is then added with agitation to an aqueous liquid system containing an alkaline compound, preferably ammonium hydroxide, in an amount sufficient to neutralize at least about 10 percent of the carboxylic acid groups present in the polymer. The organic solvent is extracted from the resulting mixture by distillation preferably simultaneously with the addition of the polymer solution to the aqueous liquid system. Carbon black particles are then added to the resulting latex in an amount to produce the desired concentration of carbon black in the polymer. The resulting latex can be employed in that form to provide the conductive screen according to the teachings of this invention or the solids content of the latex can be concentrated by removing water as desired. It is generally preferred that the latex have a solids content on the order of between about 20 and about 70 percent by weight of the conductive polymer material.

The metal shield 7 is then formed around the core screen 6 by longitudinally folding a strip of aluminum or the like in a suitable cable forming apparatus such that the edges of the strip are overlapped to provide a longitudinal seam. The thickness of the metal shield 7 is largely a matter of personal choice and will depend upon such factors as the load which the cable is designed to carry, the environment where the cable is to be used, and the like. As a general rule, the cross-sectional area of the metal shield should be about equal to the cross-sectional area of the conductor. The metal shield can also be in the form of a plurality of copper wires helically wound around the core screen by means of a suitable cable wrapping apparatus. The metal shield can optionally have a coating of an adhesive polymer material on one or on both sides thereof to form a strong bond with the adjoining elements of the cable. The olefin-ethylenically unsaturated carboxylic acid copolymers which are blended with carbon black to form the latex-deposited core screen can be used without carbon black to provide the adhesive coating on the metal shield. The adhesive coating on the side of the metal shield in contact with the core screen is rendered conductive by loading with carbon black. An adhesive copolymer of ethylene containing about 8 percent by weight combined acrylic acid is particularly suitable for use as an adhesive coating on the metal shield. This adhesive coating can be applied to the metal shield by any suitable technique such as, for example, extrusion coating, film laminating, or the like.

When an outer jacket 9 is desired, it is formed around the metal shield 7 by passing the cable through a suitable cross-head die extruder. When the metal shield has an adhesive coating for the purpose of forming a strong bond with the adjacent elements of the cable, the heat imparted to the metal shield during the extrusion of the outer plastic jacket causes the adhesive polymer to form a strong bond with the core screen and with the outer jacket.

Cables fabricated with the core screen deposited from a latex according to the teachings of this invention are superior to and have many advantages over cables produced by extruding the core screen according to the prior art techniques. One advantage is that the core screen can be made much thinner than a core screen produced by extrusion. This results in a smaller cable which has the advantage of being able to dissipate heat better than a thicker cable. The thinner core screen is also more attractive economically because less material is required than that used in forming the core screen by extrusion. The boundary resistance between the core screen and the metal shield of a cable fabricated according to this invention is much lower than the boundary resistance of cables fabricated according to the teachings of the prior art because of the higher concentrations of carbon black.

The adhesive polymer material deposited from the latex to form the core screen has the characteristics of forming a stronger bond with the metal shield than the bond which it forms with the layer of insulation. The better bond with the metal shield allows splices to be made more conveniently because when the outer jacket and metal shield are stripped from the cable in the process of forming a splice the core screen will strip off with the metal shield thus obviating the necessity of having to remove the core screen as a separate operation.

In a modification of the invention, the core screen can be formed by the successive steps of extruding an electrically conductive polymer material on the insulating layer and subsequently passing the resulting product through the latex bath to produce a latex-deposited layer of the electrically conductive polymer material on the extruded layer of electrically conductive polymer material. In this embodiment of the invention the advantages of the latex-deposited electrically conductive core screen are realized even though only the outermost layer of the core screen is deposited from the latex.

The following examples illustrate the invention. It is to be understood that these examples are for the purpose of illustration only and should not be construed as limiting of the invention.

EXAMPLE I

A cable core comprising a copper conductor having an insulating layer of polyethylene was provided with a screen of conductive polymer material by passing the cable core through a bath containing a latex of a blend of a terpolymer of ethylene, acrylic acid, and isobutyl acrylate and high structure carbon black present in an amount equal to about 35 weight percent based upon the total weight of the blend. The latex is prepared by the technique described in U.S. Pat. 3,389,109. Carbon black was added to the latex in an amount sufficient to produce the blend containing 35 weight percent carbon black.

The cable core having the latex-deposited core screen is then dried by heating and subsequently passed through a cable wrapping machine which longitudinally folds an 8 mil thick strip of aluminum around the core screen such that the edges of the aluminum strip are overlapped to provide a longitudinal seam. The cable core having the aluminum shield is then passed through a cross-head die extruder and an outer jacket of polyethylene extruded thereon.

EXAMPLE II

The technique of Example I is repeated except that the 8 mil thick aluminum strip has a coating about 2.5 mils thick on both sides of a random copolymer of ethylene and acrylic acid containing about 8 percent by weight combined acid. The inner coating of the random copolymer on the aluminum strip contains about 35 weight percent carbon black such that it is conductive and thus forms a conductive layer between the aluminum shield and the core screen. The heat imparted to the cable during the extrusion of the outer jacket of polyethylene causes the random copolymer coatings to form strong bonds with the screen of conductive polymer material and with the outer jacket.

EXAMPLE III

To illustrate the improvement in the boundary resistance of a conductive polymer layer deposited from a latex in accordance with the teachings of this invention, several circular discs were prepared by compression molding chlorinated polyethylene containing about 50 weight percent conductive carbon black. Each of the discs had a thickness of about 1/8" and a diameter of about 2". In measuring the boundary resistance, the discs were individually positioned between two brass electrodes having a surface configuration approximately the same as the discs. The weight of the upper electrode was such that it applied a pressure greater than 1 p.s.i. on the disc being measured. A current was passed between the electrodes and the voltage drop measured. The average resistance of the several discs measured is reported in Table I below, as a Control.

Several other discs of chlorinated polyethylene containing about 50 weight percent carbon black of the same type as described above, were provided with a coating of a latex of a conductive polymer material and the boundary resistance measured by the same technique. The latex contained 23.8 weight percent solids and had a pH of 9.4. The polymer in the latex was a random copolymer containing about 83.2 percent combined ethylene and about 16.8 percent combined acrylic acid. The polymer of the latex was rendered conductive by adding conductive carbon black in an amount sufficient to provide about 60 weight percent based upon the total weight of the solids in the latex. The latex containing the conductive polymer was applied to both surfaces of the discs by brushing and the discs were allowed to dry in air. The average resistance of several discs is reported in Table I below as Run No. 1.

TABLE I

| Run No.: | Resistance (ohms) |
| --- | --- |
| Control | 85 |
| 1 | 18 |

It is evident from the data in Table I that the resistance of the disc without the latex-deposited conductive polymer is about 4.7 times higher than is the resistance of the disc illustrative of the invention.

EXAMPLE IV

Another set of discs was prepared by the technique described in Example III. In these runs, the percent solids in the latex was increased by allowing some of the water to evaporate. Some of the discs of carbon black loaded chlorinated polyethylene were coated with the latex and dried in an air oven for about 1 minute at a temperature of about 125° C. The discs without the latex coating were tested for boundry resistance by the same technique described in Example III. The results of these tests are reported in Table II below as a Control. The discs with the latex-deposited coatings were similarly tested for boundary resistance. The results of these tests are reported as Run No. 1 in Table II.

TABLE II

| Run No.: | Resistance (ohms) |
| --- | --- |
| Control | 125 |
| 1 | 19.5 |

It is evident from the results in Table II that the resistance of the discs without the latex coating is more than 6 times greater than the resistance of the discs illustrative of the invention.

EXAMPLE V

In another series of runs, the same materials and the same technique described in Example IV were employed except the boundary resistance was measured at room temperature and at 90° C. by placing the electrodes and disc in an oven. The results of these runs are reported in Table III. The Control run in Table III represents the average resistance of several discs of chlorinated polyethylene containing carbon black without any latex coating. Run No. 1 in Table III represents the average resistance of several discs having the conductive polymer coating deposited from a latex.

TABLE III

| | Resistance (ohms) | |
| --- | --- | --- |
| Run No. | Room temp. | 90° C. |
| Control | 200 | 35 |
| 1 | 34 | 8.1 |

While the data in Table III show that the boundary resistance of the discs without the latex coating (Control) is improved (reduced) by heating, the results in Table III also show that upon heating the boundary resistance of the discs without the latex coating is still more than 4 times greater than the boundary resistance of the discs which illustrate the concept of this invention.

EXAMPLE VI

Several discs were prepared by the technique described in Example III except the resistive polymer used in fabricating the discs was a copolymer of ethylene and ethyl acrylate. Several of the discs were coated with the latex described in Example III and tested for boundary resistance. The results of these tests are reported as Run No. 1 in Table IV. Several discs without a latex coating were similarly tested for boundary resistance and the results of these tests are reported as a Control in Table IV.

TABLE IV

| Run No.: | Resistance (ohms) |
| --- | --- |
| Control | 41.5 |
| 1 | 17.5 |

It is evident from the results reported in Table IV that the resistance of the discs without the latex-deposited conductive polymer coating is about 2.5 times higher than the resistance of the discs which illustrate the invention.

It is clear from the data reported in Examples III through VI that the boundary resistance of a conductive polymer layer deposited from a latex according to the teachings of this invention is much lower than the boundary resistance of a resistive polymer material without the latex-deposited coating.

Although the invention has been described in considerable detail, it must be understood that such description is for the purpose of illustration only and should not be construed as limiting of the invention.

What is claimed is:

1. In a method of fabricating an electric cable having
    a conductor,
    a conductor screen of an electrically conductive polymer material surrounding said conductor,
    an electrically insulating layer of a polymer material surrounding said conductor screen,
    a core screen of an electrically conductive polymer material surrounding said insulating layer, and
    a metal shield surrounding said core screen,
    the improvement comprising, passing said cable, having said insulating layer as the exterior layer, through a bath containing a latex of electrically conductive polymer material comprising a blend of between about 25 and about 60 weight percent carbon black, based upon the total weight of said blend, and a polymer selected from the group consisting of a copolymer of an olefin and an ethylenically unsaturated carboxylic acid and a terpolymer of an olefin, an ethylenically unsaturated carboxylic acid, and an alkyl ester of an ethylenically unsaturated carboxylic acid or a vinyl ester of a saturated carboxylic acid to deposit the electrically conductive polymer material on said insulating layer to form said core screen in the form of a layer having a thickness between about 0.5 and about 5 mils, said latex having between about 20 and about 70 weight percent solids.

2. In a method of fabricating an electric cable having
a conductor,
a conductor screen of an electrically conductive polymer material surrounding said conductor,
an electrically insulating layer of a polymer material surrounding said conductor screen,
a core screen of an electrically conductive polymer material surrounding said insulating layer, and
a metal shield surrounding said core screen, the improvement comprising, forming said core screen by the successive steps of
(A) passing said cable, having said insulating layer as the exterior layer, through an extrusion zone to produce an extruded layer of electrically conductive polymer material on said insulating layer, and
(B) passing said cable, having said extruded layer of electrically conductive polymer material as the exterior layer, through a bath containing a latex of electrically conductive polymer material comprising a blend of between about 25 and about 60 weight percent carbon black, based upon the total weight of said blend, and a polymer selected from the group consisting of a copolymer of an olefin and an ethylenically unsaturated carboxylic acid and a terpolymer of an olefin, an ethylenically unsaturated carboxylic acid, and an alkyl ester of an ethylenically unsaturated carboxylic acid or a vinyl ester of a saturated carboxylic acid to deposit the electrically conductive polymer material as a layer having a thickness between about 0.5 and about 5 mils on said extruded layer of electrically conductive polymer material, said latex having between about 20 and about 70 weight percent solids.

No references cited.

ROBERT F. WHITE, Primary Examiner

J. R. THURLOW, Assistant Examiner

U.S. Cl. X.R.

260—29.6 H, 29.6 TA; 264—171, 178, 236